United States Patent [19]
Felder et al.

[11] Patent Number: 5,470,489
[45] Date of Patent: Nov. 28, 1995

[54] METHOD AND INLET DEVICE FOR CHARGING SHALLOW GRIT CHAMBERS OR SETTLING TANKS

[76] Inventors: Anton Felder, Schlotthauerstrasse 5, D-8000 Munich; Franz Valentin, Arcisstrasse 21, D-8000 Munich 2, both of Germany

[21] Appl. No.: 142,318
[22] PCT Filed: Feb. 12, 1993
[86] PCT No.: PCT/EP93/00349
 § 371 Date: Nov. 17, 1993
 § 102(e) Date: Nov. 17, 1993
[87] PCT Pub. No.: WO93/20918
 PCT Pub. Date: Oct. 28, 1993

[30] Foreign Application Priority Data

Apr. 15, 1992 [DE] Germany .......................... 42 12 631.2

[51] Int. Cl.[6] .......................... B01D 21/26; B01D 21/24; B01D 21/02
[52] U.S. Cl. .................. 210/788; 210/787; 210/512.1; 210/80; 210/514; 210/521
[58] Field of Search ................. 210/512.1, 788, 210/787, 801, 514, 521

[56] References Cited

U.S. PATENT DOCUMENTS

| | | | |
|---|---|---|---|
| 3,945,920 | 3/1976 | Pazyc et al. | 210/801 |
| 3,972,814 | 8/1976 | Pazyc et al. | 210/801 |
| 4,059,529 | 11/1977 | McGivern | 210/519 |
| 4,886,605 | 12/1989 | Hervé | 210/519 |

FOREIGN PATENT DOCUMENTS

| | | |
|---|---|---|
| 1142798 | 1/1963 | Germany . |
| 2051021 | 2/1972 | Germany . |
| 9112947 | 1/1992 | Germany . |

*Primary Examiner*—Robert A. Dawson
*Assistant Examiner*—David Reifsnyder
*Attorney, Agent, or Firm*—George W. Dishong

[57] ABSTRACT

A method and apparatus for charging either a a shallow grit tank or a settling tank with waste water by means of a horizontal feed line and a horizontal drain line using the Coanda Effect. The waste water is pressured through a gap which directs the waste water stream onto a curved surface. Due to the Coanda Effect, the direction of the waste water is changed from downward when used in a shallow grit tank or changed from upward when used in a settling tank, to a substantially horizontal direction. The mineral constituents and the organic constituents of the waste water are consequently separated.

20 Claims, 3 Drawing Sheets

METHOD AND INLET DEVICE FOR CHARGING SHALLOW GRIT CHAMBERS OR SETTLING TANKS

BACKGROUND OF THE INVENTION

1. Field of the Invention

The invention relates to an inlet device for charging shallow grit chambers with waste water having a feed line into and a drain line out of, a rectangular tank.

The invention also relates to an inlet device for charging settling tanks.

The invention relates, on the one hand, to a method of charging such shallow grit chambers and also to a method of charging such settling tanks.

2. Description of the Prior Art

To separate grit from the waste water, grit chambers are used in a known manner in sewage treatment plants with the objective of obtaining a clean sand, i.e. a sand largely free of organic admixtures, regardless of variations in the waste water inflow. Common to these grit chamber structures of a very wide variety of designs is the fact that they exploit gravity (in the case of a shallow grit chamber) or gravity and centrifugal force (in the case of hydrocyclones and circular tanks) to separate grit from waste water. The advantage of the grit chambers last mentioned compared with those based on the pure gravitational principle, must, however, not be assessed too highly in relation to the sizing effect because of the relatively low radial acceleration. The grit is separated essentially under the influence of gravity. The circular and spiral movement of the waste water effected by the shape of these grit chambers is used primarily to convey solids into the grit collecting chamber.

The technological background to the construction of shallow grit chambers is that the mineral constituents down to a separation size of $d_p \geq 0.1$ to 0.2 mm are to be separated from the waste water, while the organic components are to be conveyed further to the downstream purification stages. For this purpose, shallow grit chambers are predominantly used. The shallow grit chambers are charged horizontally via a pipeline. In that case, to even out the flow, grids or baffle plates, which, according to Dr. -Ing. H. Patt (Institute for Water Usage, University of the Federal German Army, Munich, 1990, ISSN 0720-1273), do not, however, have any effect on the total retention factor, are often arranged in the inlet region. In the case of the horizontal flow through the shallow grit chamber, the organic particles contained in the waste water are then separated with the aid of gravity by means of the different settling rates. Depending on the amount of inflow, a grit chamber minimum length, which, according to Camp, can be determined by measuring the surface charging, is necessary for the settling process.

On the other hand, it is not denied that, in the case of settling tanks, it is known to feed them from a feed channel via a certain number of inlet pipes. In the case of a settling tank it is important to achieve a uniform and low flow as quickly as possible.

SUMMARY OF THE INVENTION

The object of the invention is to provide a structurally simple device for charging shallow grit chambers with waste water, on the one hand, and for charging settling tanks with waste water, on the other hand, by means of which device the grit chamber length required hitherto for the settling process can be reduced by up to 50% for the same feed rate, or, in the case of settling tanks, the hydraulic efficiency can be increased from 50 up to 90% for the same feed rate and tank size as before.

Surpisingly, this is achieved, according to the invention, in an inlet device for charging shallow grit tanks with waste water having a feed line into, and a drain line out of, a rectangular tank, by constructing the feed to the tank as an inlet chamber having a base plate on which a control plate extending over the entire grit chamber width and adjustable with respect to it is mounted and forms an adjustable outlet gap with a deflection cylinder arranged horizontally opposite to it.

This object is achieved in an inlet device for charging settling tanks, wherein the feed to the tank is constructed as an inlet chamber, at whose outlet a control plate which extends over the entire settling tank width and is adjustable with respect to it is mounted and forms an adjustable outlet gap into the settling tank with a curved deflection plate arranged opposite to it.

Expediently, in the case of the shallow grit chamber, the inlet chamber is constructed as closed in the upward direction in the region of the cylinder.

In general the deflection cylinder is constructed as a separate body over the width of the grit chamber. An expedient construction for grit chambers is distinguished by the use of the Coanda effect in such a way that the waste water flowing horizontally into the pre-chamber i.e., the inlet chamber is first deflected vertically downwards and then at least into the horizontal or vertically upwards again.

It is obvious that the so-called cylinder may be constructed in such a manner as to be substantially hollow or it may be solid. The radius of the right circular cylinder is of a value such that given a particular velocity and volume of inflow of waste water, the Coanda effect will be achieved and the minerals will be separated and fall into the bottom of the grit chamber for later removal and the organics and the waste water will be deflected to such an extent so as to not fall within the grit chamber but be deflected and end up in a tank for processing of the organic laden waste water. The degree of deflection will clearly be a function of the density of the organics in the waste water. Heavier organics will be deflected through a deflection angle less than the deflection angle of lighter organics.

It is not denied that methods are known per se which effect a separation of the mineral constituents from the waste water by utilizing gravitational and centrifugal force. Not, however, in shallow grit chambers and utilizing the so-called Coanda effect.

The dimensions of the shallow grit chambers are known to be coupled to the inflow and the sedimentation due to gravity. The grit chambers are therefore inevitably becoming increasingly larger because of the increased amount of waste water. This is often opposed, however, by the lack of the space required in sewage treatment plants. It is here that the measure according to the invention signifies a surprising step forwards.

The advantages achieved with the invention in the case of shallow grit chambers is, in particular, that the deflection and guidance of the liquid phase along the boundary of the cylinder after leaving the gap takes place by utilizing the Coanda effect and is therefore precisely predictable. At the same time the mineral constituents entrained in the liquid phase are acted on not only by gravity but by a centrifugal force due to the deflection at the cylinder. These forces are opposed only by a very small pressure force which results from the radial curvature and which is directed toward the center of rotation. When the liquid phase is deflected, the grit grains are therefore automatically catapulted out of it and immediately sink downwards in the direction of the base of the grit chamber. In addition, the physical processes occurring under these circumstances are predictable.

In the case of the settling tank, the inlet device establishes a roller system which is, on the one hand, induced by the deflected jet and, on the other hand, guides the jet in the direction of the surface after leaving the guidance structure. This phenomenon, known as folding the jet upwards in the specialist field, will additionally compensate naturally for the somewhat higher density of the sludge/water mixture and, consequently, for the tendency to sink.

The advantage of the inlet device in the case of the settling tank is that a precisely predictable velocity profile is provided at the end of the guidance structure. How flow takes place into the actual sedimentation chamber is consequently precisely known. Ideally, the sludge/water mixture leaves the inlet device horizontally at the boundary between separation zone and storage zone.

The abovementioned object of increasing the hydraulic efficiency from 50 to up to 90% for the same feed rate in the case of the settling tank is completely achieved.

Generally, "Coanda effect" is understood as meaning the deflection of a jet toward a curved wall. The attraction is based on an underpressure action in the region of the edge of the jet on the wall side.

It is not denied that an inlet having Coanda effect has already been proposed in the case of settling tanks through which flow takes place transversely and which have movable intermediate bases, without a precise design construction being specified (German Offenlegungsschrift 20 51 021). The German Offenlegungsschrift, which has not in any case resulted in a patent, does not relate to an inlet chamber having a control plate and forced gap outflow utilizing the Coanda effect. The teaching in the German Offenlegungsschrift does not in any case proceed beyond that of the basic patent of Henry Coanda, German Patent Specification 792 754 dated 10 Jun. 1936.

However, the abovementioned object too is completely achieved in the case of the shallow grit chamber, which can be built up to 50% shorter and that at the same feed rate. Substantially less room is consequently used, and this signifies an increasingly greater advantage with the constriction in the densely populated countries. A so-called "compact grit chamber" is consequently made available.

According to an advantageous embodiment of the invention (shallow grit chamber), the direction of the jet flowing into the shallow grit chamber can be systematically controlled by varying the deflection angle β of the cylinder since the geometrical separation point can be predetermined precisely. A further possibility is consequently provided for intensifying the sedimentation process. With a suitable difference in potential (difference given by water level in the inlet chamber–water level in the grit chamber) or the ratio of radius R of the cylinder to gap width, deflections of up to 180° can be achieved at the boundary of the cylinder. It is important that the device according to the invention makes it possible to alter the exit area of the gap by interchanging the control plate or by slidably adjusting the control plate relative to the adjacent cylinder wall thereby increasing or decreasing the width of the outlet gap. It is thus possible to adapt to operational changes at a later date in a simple way. This is also true for the settling tank in a corresponding application.

An expedient development is given in further subclaims.

Expediently, a screen is arranged in the inlet chamber for shallow grit chambers over their width. This retains coarse material, which makes possible shortened preclarification times and, on the other hand, effects an evening-out of the flow in the pre-chamber.

The conditions in the inlet chamber for shallow grit chambers can be controlled particularly advantageously if the control plate is constructed so as to be completely adjustable, that is to say positionally variable on the one hand with respect to the base plate on which it is mounted and, on the other hand with respect to the cylinder.

The invention also relates to a method of charging shallow grit chambers with waste water. This method is distinguished by the fact that the Coanda effect is used for the separation of the mineral component and for the decelerated uniform introduction.

Preferably, the liquid phase is deflected at the convex body and a centrifugal force is imparted to the mineral constituents in the case of shallow grit chambers.

If, in particular, settling tanks are charged with waste water from a feed system by this method using the Coanda effect, the waste water is supplied, according to the invention, from said feed system via inlet pipes arranged at a uniform horizontal spacing to an inlet chamber extending, in particular, over the entire tank width and is brought uniformly out of the latter as a gap flow, in which process the Coanda effect is used for the separation of mineral constituents entrained in the liquid phase and for the decelerated uniform introduction into the tank.

Exemplary embodiments of the invention will now be explained in greater detail with reference to the accompanying drawings. In the drawings: FIGS. 1–4 show inlet devices for shallow grit chambers and FIG. 5 shows one for settling tanks.

BRIEF DESCRIPTION OF THE DRAWINGS

More precisely

DESCRIPTION OF THE PREFERRED EMBODIMENT

Figure 1:
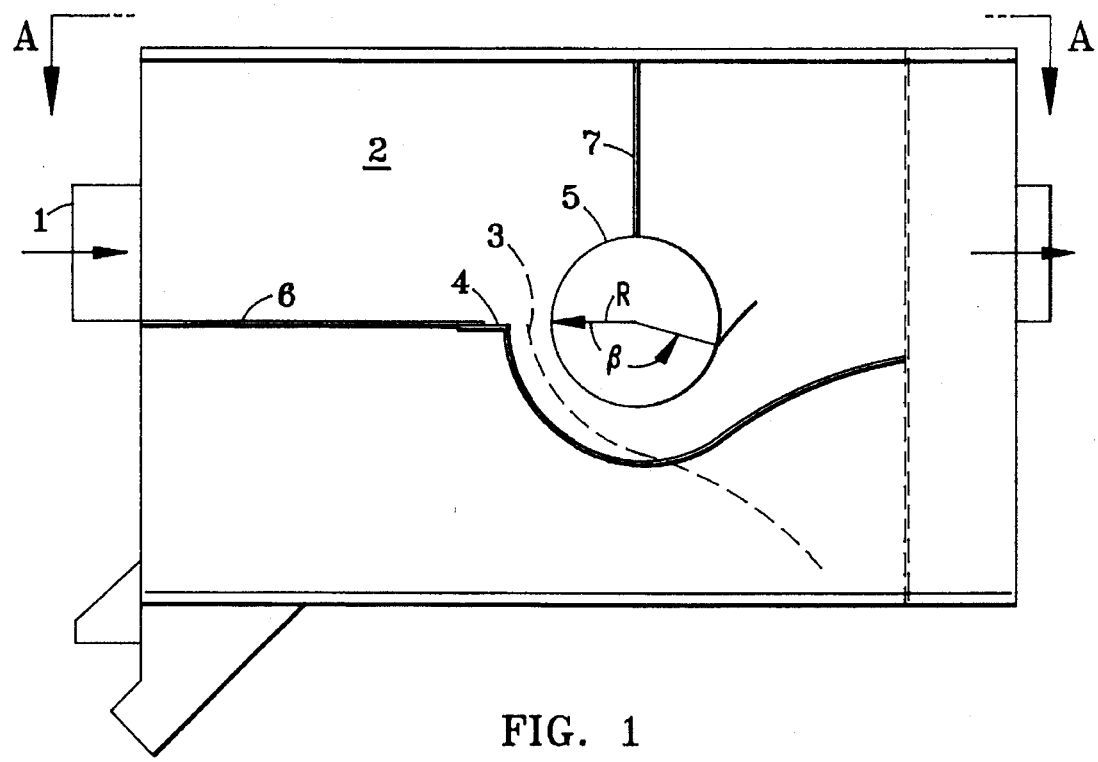
FIG. 1 shows a diagrammatic view of a first embodiment.
Figure 2:
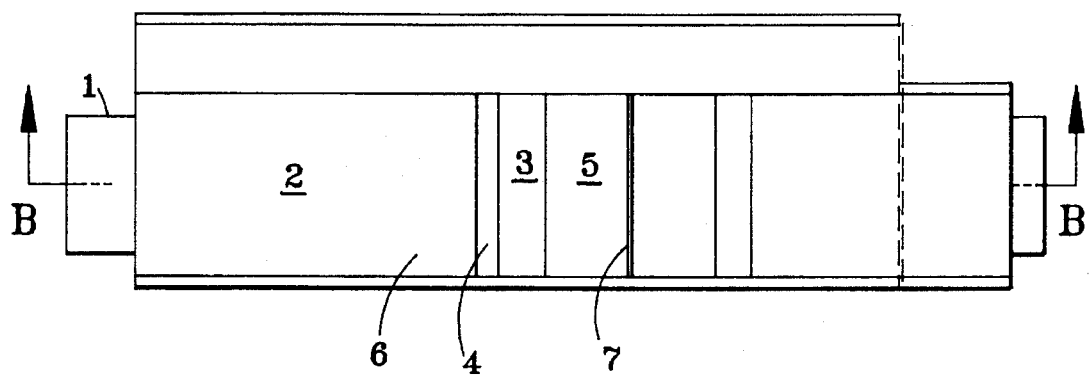
FIG. 2 shows a plan view of FIG. 1.

According to the embodiment of the invention shown in FIGS. 1 and 2, the waste water flows horizontally through the inlet pipeline 1 into an inlet chamber 2. At the end of the inlet chamber 2 there is a gap 3 which is formed by a control plate 4 and a cylinder 5 of radius R situated horizontally opposite. The control plate 4 is adjustably fixed to the horizontal base plate 6 of the inlet chamber 2. The deflection cylinder 5 is situated below the terminating wall 7 of the inlet chamber 2. It is clear to one of ordinary skill in the related field that cylinder 5 need not have curvature in the quadrant, that is the quadrant which, in combination with terminating wall 7 closes off inlet chamber 2. Deflection based upon Coanda is only needed in the region of the grit chamber lying below base plate 6 and control plate 4. Thus, a half right circular cylinder having radius R will provide the deflection surface needed to properly deflect the organic laden waste water. A complete right circular cylinder 5 is disclosed because it is expedient to manufacture and would provide strength in situations where such strength is required. The waste water passes through the gap 3, leaves the latter and is deflected at the deflection cylinder 5 and finally reaches the (again) horizontal drain. The path is approximately indicated in the drawing by the arrow. The mineral constituents entrained in the liquid approximately follow the trajectory shown as a broken-line curve under the action of gravity and centrifugal acceleration.

According to the diagram, the inlet chamber is closed by a horizontal wall between the top of the chamber and the cylinder. The waste water is deflected toward the curved wall under the influence of the Coanda effect, which is based on the underpressure action in the region of the edge of the waste water jet on the wall side.

FIG. 1 shows section B—B through FIG. 2, and FIG. 2 is the plan view of FIG. 1 in accordance with the arrows A—A.

FIG. 2 reveals that the gap extends over the entire width and the cylinder is likewise mounted over the entire width, with the result that the waste water guidance has automatically to take place past the underside of the cylinder since, with a large impoundment, flow over the cylinder is, after all, prevented by the wall 7.

Because of the flow pattern and the unavoidable losses, the open spaces upstream and downstream of the cylinder are to be seen as in FIG. 1 (have different heights).

The crucial feature is the deflection angle $\beta$ (see FIG. 1), which makes it possible to control the direction of the jet entering the shallow grit chamber systematically.

Figure 3:
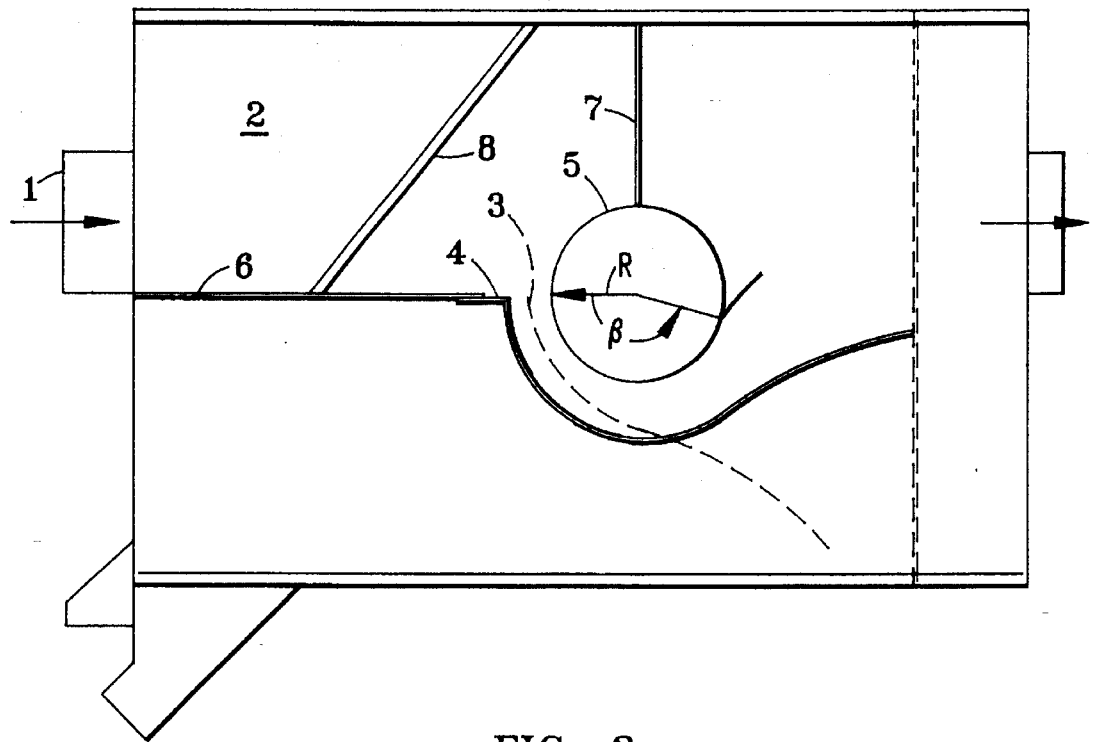
FIGS. 3 and 4 show variants and supplementary possibilities for the embodiment shown in FIG. 1.
Figure 4:
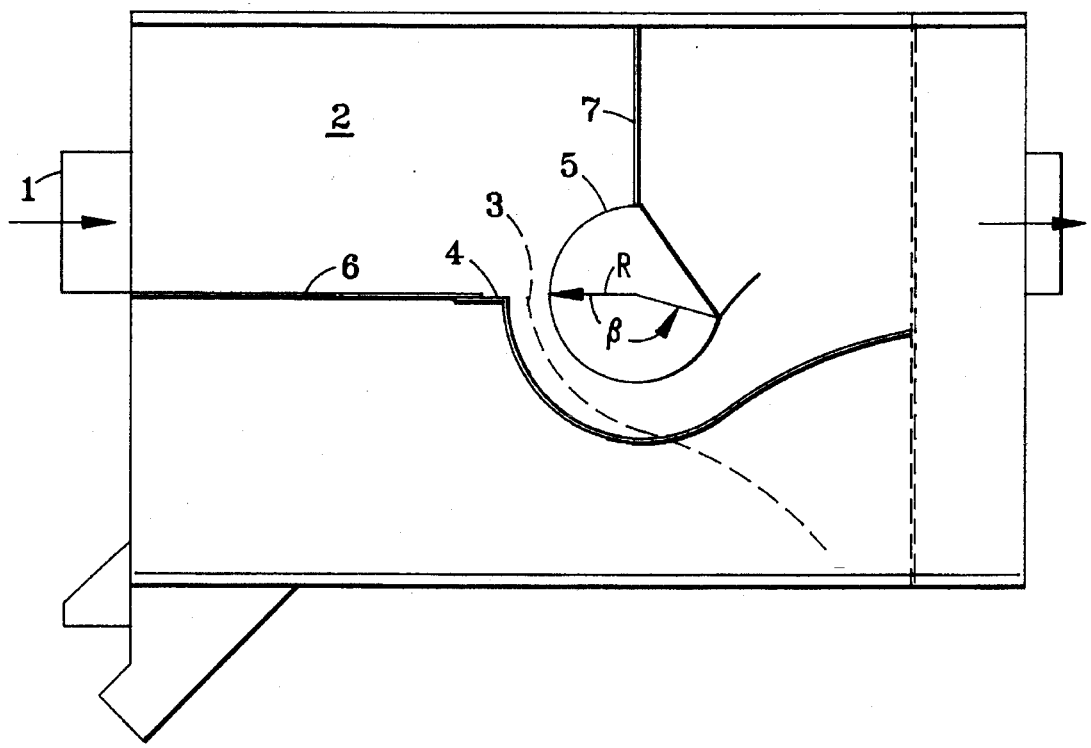

How the geometrical separation point can be predetermined can readily be recognized in FIG. 3, while how it can be altered is shown by FIG. 4.

The same reference symbols are used for the same components in FIGS. 3 and 4.

FIG. 3 shows an embodiment in conjunction with a screen 8. The coarse materials contained in the waste water flowing in via the pipe 1 are retained at the screen and, in addition, an alignment of the flow in the inlet chamber 2 is achieved.

FIG. 4 shows a modified embodiment of the deflection cylinder 5. The geometrical separation point of the liquid phase can be predetermined by varying the deflection angle $\beta$ and the flow pattern in the shortened grit chamber tank can also consequently be influenced. In this case, the cylinder is cut off in segment fashion toward the geometrical separation point. It would be obvious to an ordinarily skilled artisan that the deflection angle 13 may be controlled by providing for a rotatable right circular cylinder positioned interior of the deflection surface of the deflection cylinder 5 thereby providing for control of the deflection angle. Alternatively, one could simply have a choice of deflection cylinders having different segments cut out of the surface thus defining different deflection angles. It is not pertinent to the essence of the invention as to how one might achieve the deflection angle variability for there would be many ways to do so the above noted ways are simply exemplary. Likewise it is apparent that the upper surface of the deflection cylinder 5 need not have a radius. This surface serves only to provide closure for inlet chamber 2.

Figure 5:
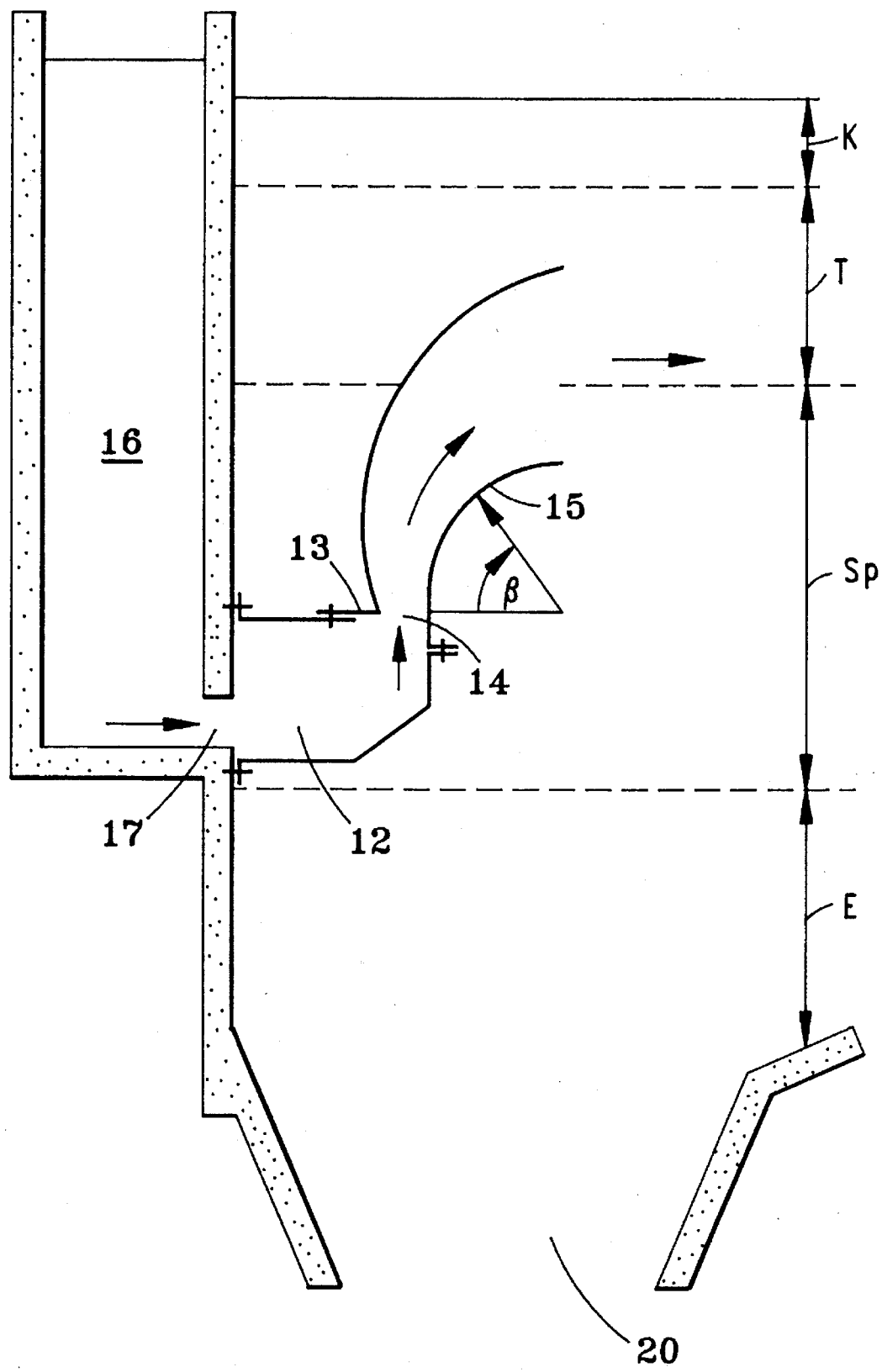
FIG. 5 shows a diagrammatic further embodiment for settling tanks.

The inlet device shown in FIG. 5 for settling tanks to decelerate and uniformly distribute the sludge/water mixture in the case of rectangular final clarification tanks comprises an inlet chamber 12 which extends over the entire tank width and at whose top there is an outlet gap which can be varied by a control plate 13. A curved deflection plate 15 is attached as a direct continuation of the gap 14 opposite the control plate. The inlet chamber 12 is generally fed from a feed channel 16 via a certain number of inlet pipes 17. An evening-out of the gap flow is brought about in the inlet chamber 12 as a result of the considerable deceleration and pressure rearrangement upstream of the outlet gap 14. The jet leaving the outlet gap 14 is now deflected at the convexly curved guidance structure 15 as a result of the Coanda effect. During the deflection, the jet is very considerably widened by the admixture of liquid at the free boundary of the jet. This brings about a reduction in the difference in density between the incoming jet and the tank flow and also a reduction in the velocity and, consequently, kinetic energy. The shape of the velocity profile and the jet widening are maintained regardless of the flow rate (similarity principle).

Clearly, the width of outlet gap 3 and outlet gap 14 can be altered by adjusting the location of control plate 4 relative to base plate 6 for the grit chamber use and by altering the location of control plate 13 relative to deflection plate 15. In each case the adjustment could be made by providing slotted mounting apertures which would permit the horizontal sliding of control plate relative to base plate in each instance. An engineer of ordinary skill will find any number of ways to accomplish this adjustment.

Above the inlet device (12–15), there is established a roller system which, on the one hand, is induced by the deflected jet and, on the other hand, deflects the jet in the direction of the surface after leaving the guidance structure. This folding up of the jet compensates, after all, for the somewhat higher density of the sludge/water mixture, as mentioned above.

The measure, in particular the embodiment of FIG. 5, provides a precisely predictable velocity profile at the end of the guidance structure 15 in the settling tank. How flow takes place into the actual sedimentation chamber is consequently precisely known. Ideally, the sludge/water mixture leaves the inlet device horizontally at the boundary between the zone T (separation zone) and zone Sp (storage zone). As is known, the zone K (clear water zone) is situated above the separation zone while the zone E (thickening zone) is situated underneath the storage zone before a sludge funnel 20 provides for collection and removal in a manner known per se.

The inlet chamber 12 may have varying size and shape. Usually it is arranged at the base of the settling tank also at the level of the base of the feed and is fed directly via the inlet pipes, which are likewise at its base. Arrangement at a different point is possible, but it is important that the requirement that the sludge/water mixture leaves the inlet device horizontally at the boundary between separation zone and storage zone is fulfilled. The inlet device is shown as angular in its base region. Curved transitions are, of course, possible. The exit from the inlet chamber can be varied as desired by means of the control plate 13, it only being important that the jet adheres to the curved deflection plate 15, the inlet chamber is sealed in the inlet region from the settling tank and the gap 14 merges into a structure which opens in diffuser-like fashion. The inlet openings 17 may also be arranged so as to be distributed over the tank in accordance with other stipulations, provided the jet emerges uniformly over the entire width of the tank as a result of the arrangement of the inlet pipes 17 and the exit from the gap 14.

The embodiment of FIG. 5 is virtually an embodiment in accordance with FIGS. 1–4 which is "turned over" for a final clarification tank. The measure according to the invention now establishes a residue of, for example, 5 mg/l at the drain compared with 180 mg/l residue hitherto.

I claim:

1. A method of charging shallow grit chambers with waste water from a feed utilizing the Coanda effect, comprising the steps of:

introducing said waste water into an inlet chamber in a flow direction directed substantially horizontally and orthogonal to direction of gravitational forces, said gravitational forces being vertical and downwardly directed;

pressuring said waste water from said inlet chamber through an outlet gap downwardly directed;

contacting said waste water flowing from said outlet gap with a curved deflection surface thereby deflecting, using the Coanda effect, said waste water from said downwardly directed flow direction to, at least a substantially horizontally directed flow direction away from said inlet chamber for each said grit chamber, said waste water having mineral constituents being separated thereby from said waste water when in use with said grit chamber.

2. A method of charging a settling tank with waste water from a feed utilizing the Coanda effect, comprising the steps of:

introducing said waste water into an inlet chamber in a flow direction directed substantially horizontally and orthogonal to direction of gravitational forces, said gravitational forces being vertically and downwardly directed;

pressuring said waste water from said inlet chamber through an outlet gap upwardly directed;

contacting said waste water flowing from said outlet gap with a curved deflection surface thereby deflecting, using the Coanda effect, said waste water from said upwardly directed flow direction to, at least a substantially horizontally directed flow direction away from said inlet chamber, said waste water having organic constituents being caused to settle from said waste water when in use with said settling tank.

3. An inlet device for charging shallow grit chambers with waste water comprising:

a tank having a plurality of wall means defining a volume thereof, said tank defining thereby said shallow grit chamber;

an inlet chamber on an inlet end of said tank, said inlet chamber having a waste water feed line directed substantially horizontal and orthogonal to direction of gravitational forces, said gravitational forces being vertical and downwardly directed, into said inlet chamber, said inlet chamber having a bottom defined by a substantially horizontally disposed base plate, a control plate horizontally adjustably attached to an end of said base plate, a terminating wall and an upper quadrant deflection cylinder wall contiguous with a bottom edge of said terminating wall, said base plate, terminating wall and upper quadrant deflection cylinder wall, in combination with at least some of said plurality of wall means defining said tank, creating said inlet chamber;

an outlet gap situated at an outlet of said inlet chamber, said outlet gap defined by one edge of said control plate and an adjacent surface of said upper quadrant deflection cylinder wall adjacent to said one edge of said control plate, said outlet gap having width defined by said adjustably attached control plate and said adjacent surface of said upper quadrant deflection cylinder wall and having a length substantially about equal to said width of said tank;

a substantially semicircular deflection cylinder wall continuous with said adjacent surface of said upper quadrant deflection cylinder wall and below said outlet gap, said substantially semicircular cylinder wall having a radius of curvature effective to cause a deflection of a downwardly directed flow of said waste water from said downward direction to substantially an upward direction creating thereby deflected waste water, said radius of curvature, a center line of said radius being substantially horizontal and substantially parallel to said one edge of said control plate; and a deflection angle defined by a number of degrees of rotation from said adjacent surface to where said deflected waste water is undeflected, said deflection angle number of degrees being between about 90° and about 180°.

4. The inlet device according to claim 3, wherein the inlet chamber is closed in the upward direction in the region of said terminating wall and said upper quadrant deflection cylinder wall.

5. The inlet device according to claim 3, wherein said substantially semicircular deflection cylinder wall continuous with said adjacent surface of said upper quadrant deflection cylinder wall and said upper quadrant deflection cylinder wall is a right circular cylinder and constructed as a separate body over the width of said shallow grit chamber.

6. The inlet device according to claim 5, wherein said tank defining said shallow grit chamber is substantially rectangular.

7. The inlet device according to claim 6, wherein said right circular cylinder has outside wall extending from said adjacent surface, a predetermined number of degrees thereby defining a maximum deflection angle.

8. The inlet device according to claim 7, further comprising means for retaining course particles and altering the flow of said waste water before said waste water passes through said gap.

9. The inlet device according to claim 6, further comprising means for retaining course particles and altering the flow of said waste water before said waste water passes through said gap.

10. The inlet device according to claim 5, wherein said right circular cylinder has outside wall extending from said adjacent surface, a predetermined number of degrees thereby defining a maximum deflection angle.

11. The inlet device according to claim 5, further comprising means for retaining course particles and altering the flow of said waste water before said waste water passes through said gap.

12. The inlet device according to claim 3, wherein said tank defining said shallow grit chamber is substantially rectangular.

13. The inlet device according to claim 12, further comprising means for defining a maximum deflection angle.

14. The inlet device according to claim 3, further comprising means for defining a maximum deflection angle.

15. The inlet device according to claim 3, further comprising means for retaining course particles and altering the flow of said waste water before said waste water passes through said gap.

16. An inlet device for charging a settling tank with waste water comprising:

a plurality of wall means defining a height, width and depth and defining thereby a volume of said settling tank;

a feed channel positioned at an input end of said settling tank;

at least one inlet pipe in waste water flow communication with said feed channel and an inlet chamber within said settling tank at said inlet end of said settling tank, said inlet chamber having a bottom, front and top walls defining a volume of said inlet chamber said at least one inlet pipe directed substantially horizontally and orthogonal to direction of gravitational forces, said gravitational forces being vertical and downwardly directed;

said top of said inlet chamber defined by a substantially horizontally disposed base plate, a control plate horizontally adjustably attached to an end of said base plate; and an outlet gap situated at an outlet of said inlet chamber, said outlet gap and width thereof defined by one edge of said control plate and a horizontally directed surface of a curved deflection plate adjacent to said one edge of said control plate, said outlet gap having a length substantially about equal to said width of said settling tank and wherein said curved deflection plate curves in a manner such that a deflection angle of directed tangent lines to a deflection surface of said curved deflection plate smoothly changes from being vertically upwardly directed at said outlet gap toward substantially horizontally directed away from said inlet end of said settling tank substantially at a waste water detachment end of said curved deflection plate.

17. The inlet device according to claim 16, further comprising means for removing material settled from said waste water.

18. The inlet device according to claim 16, wherein said settling tank is substantially rectangular.

19. The inlet device according to claim 18, wherein said curved deflection plate is constructed as a separate body over the width of the settling tank, said curved deflection plate further comprising means for removably attaching said curved deflection plate to said inlet chamber at said outlet gap.

20. The inlet device according claim 16, wherein said inlet chamber is constructed as a separate body for incorporation into said settling tank, said inlet chamber further comprising means for removably attaching said inlet chamber at said input end of said settling tank and in waste water flow communication, through said at least one inlet pipe, with said feed channel.

\* \* \* \* \*